(12) United States Patent
Jacobson

(10) Patent No.: US 10,933,921 B1
(45) Date of Patent: Mar. 2, 2021

(54) ILLUMINATED MUD FLAP

(71) Applicant: Kayden Jacobson, Ivins, UT (US)

(72) Inventor: Kayden Jacobson, Ivins, UT (US)

( * ) Notice: Subject to any disclaimer, the term of this patent is extended or adjusted under 35 U.S.C. 154(b) by 0 days.

(21) Appl. No.: 16/852,188

(22) Filed: Apr. 17, 2020

(51) Int. Cl.
*B62D 25/18* (2006.01)
*F21V 33/00* (2006.01)
*F21Y 115/10* (2016.01)

(52) U.S. Cl.
CPC .......... *B62D 25/188* (2013.01); *F21V 33/00* (2013.01); *F21Y 2115/10* (2016.08)

(58) Field of Classification Search
CPC ............................................. B62D 25/16–188
See application file for complete search history.

(56) References Cited

U.S. PATENT DOCUMENTS

| | | | | |
|---|---|---|---|---|
| 3,724,871 A * | 4/1973 | Evans | ................. | B62D 25/188 280/851 |
| 4,658,335 A * | 4/1987 | Culler | .................... | F21V 15/04 362/269 |
| 4,924,209 A * | 5/1990 | Kao | ......................... | B60Q 1/26 340/479 |
| 5,025,351 A * | 6/1991 | Martin | .................... | B60Q 1/30 280/851 |
| 5,833,283 A * | 11/1998 | Shaw | ...................... | B60Q 1/30 293/117 |
| 6,164,804 A * | 12/2000 | Self | ......................... | B60Q 1/30 362/485 |
| 6,547,027 B1 * | 4/2003 | Kalhok | .................... | B62J 1/12 180/210 |
| 7,654,574 B2 * | 2/2010 | Haynes | ................. | B62D 25/188 280/154 |
| 8,876,164 B2 * | 11/2014 | Eklund | ................ | B62D 25/188 280/154 |
| 9,016,912 B1 * | 4/2015 | Gustafson | ............ | B60Q 1/0088 362/485 |
| 9,120,447 B1 * | 9/2015 | Moldestad | .......... | B60R 21/0136 |
| 9,221,390 B1 * | 12/2015 | Begley | ................. | B60Q 1/2661 |
| 2003/0184078 A1 * | 10/2003 | Grable | ................. | B62D 25/188 280/847 |
| 2005/0123764 A1 * | 6/2005 | Hoffmann | ............... | H01F 41/16 428/409 |
| 2007/0223242 A1 * | 9/2007 | Blades | .................. | B60Q 1/305 362/542 |
| 2008/0310179 A1 * | 12/2008 | Bates | .................... | B60Q 1/2692 362/506 |
| 2012/0051080 A1 * | 3/2012 | Wilkerson | ........... | B60Q 1/2661 362/548 |
| 2012/0068448 A1 * | 3/2012 | Lasser | .................. | B62D 25/182 280/851 |
| 2012/0129974 A1 * | 5/2012 | DeNotta | ............... | C08L 101/12 523/221 |
| 2013/0221650 A1 * | 8/2013 | Wiltshire | ............. | B62D 25/182 280/847 |
| 2016/0144774 A1 * | 5/2016 | Alshalabi | ................. | B60Q 3/20 362/545 |
| 2018/0215417 A1 * | 8/2018 | Maier | ................... | B62D 25/168 |

* cited by examiner

*Primary Examiner* — Erez Gurari
(74) *Attorney, Agent, or Firm* — David R. Conklin; Kirton McConkie

(57) ABSTRACT

A mudflap assembly includes a bracket assembly that couples to a vehicle frame and a mudflap having a panel. The panel has a first edge coupled to the bracket assembly. The mudflap assembly also includes a lighting element encased in the bracket assembly proximate to the first edge of the mudflap. The lighting element illuminates the panel.

19 Claims, 5 Drawing Sheets

ILLUMINATED MUD FLAP

BACKGROUND

Mudflaps and their accompanying brackets are widely known in prior art as necessary accessories for trucks, tractors, trailers, and other similar vehicles. Laws and industry regulations require that certain vehicles, such as a trailer or tractor, be outfitted with mudflaps to prevent damage or injury to other vehicles and their inhabitants on the road. Mudflaps for trucks and other vehicles are intended to keep mud, rocks, and other debris from flying up at the vehicle driving behind them. However, typical mudflaps do nothing to increase the visibility of the vehicle or the designs or logos desired to be represented by an owner. For example, when driving at night, it may be difficult to see the tail lights on a truck or trailer, particularly in the rain or fog. Many accidents occur by hitting the back of a truck or trailer, just because it was not seen in time to stop. Also, mudflaps can be stylish as well as functional. Often, mudflaps incorporate designs or logos, but the illustrations are not visible at night or in the rain or fog.

Mudflaps are often mounted the fender or other portions of the vehicle body. However, for vehicles with open wheels, such as heavy duty trucks and trailers, or large wheel wells, there is often not a suitable body component to which the mud flap can be mounted. For such vehicles, a support is sometimes mounted to the vehicle frame. The support often takes the form of a rod extending laterally from the vehicle frame, with the flap being mounted to the rod. The mud flaps must be rigid to maintain the mud flap in a preferred position while being able to absorb the impact of road debris. The mud flaps must also be durable to prevent premature failure under demanding operating conditions. It is also desirable that the mud flaps be easily installed and removed. Thus, there is a need for a mud flap assembly that is functional, durable, and easily installed and removed.

The subject matter claimed herein is not limited to embodiments that solve any disadvantages or that operate only in environments such as those described above. Rather, this background is only provided to illustrate one example technology area where some implementations described herein may be practiced.

SUMMARY

Any of the features described herein may be combined in order to arrive at a desired configuration in accordance with the explicitly stated and intended operation of the present invention. Use herein of the transitional phrases "in some embodiments" and "in some instances" is not intended to limit the scope of any particular embodiment to a specific feature or set of features disclosed therewith. Rather, the intention of all the various embodiments described herein is to provide frameworks of context in which a specific feature or a set of features may be comprehended and understood in the context of the inventive concept as a whole. Accordingly, the entirety of the present disclosure is to be understood as a body of interchangeable and modular elements that may be selected and combined (in accordance with the requisite purview of one having ordinary skill in the art) to achieve a device, system, or method within the context of the inventive concept, as a whole, disclosed herein.

The present disclosure generally relates to an improved mudflap assembly for a vehicle which includes a lighting element. In some embodiments, a mudflap assembly may include a bracket assembly that couples to a vehicle frame and a mudflap having a panel. The panel may have a first edge coupled to the bracket assembly. In some embodiments, the mudflap assembly may also include a lighting element encased in the bracket assembly, proximate the first edge of the panel. The lighting element may illuminate the panel. In some instances, the mudflap is an edge-lit mudflap, wherein the lighting element lights the first edge of the mudflap to illuminate at least one of the whole body of the mudflap, or a portion of the mudflap, such as an image etched into a surface of the body of the mudflap, or otherwise provided thereon or therein.

In some embodiments, the lighting element may include a series of light emitting diodes (LEDs). The lighting element may be powered by a vehicle power supply. In some embodiments, the lighting element may be connected to an electrical trailer connector. In other embodiments, the lighting element may be connected to a vehicle tail light power supply and the lighting element changes light color, pattern, or intensity when the brakes of the vehicle are applied or the vehicle is in a reverse gear. In yet other embodiments, the lighting element may be connected to a vehicle turn signal, such that the lighting element changes light color, pattern, or intensity when the turn signal of the vehicle is activated. In some embodiments, the lighting element is constantly illuminated while the vehicle is powered on.

In some embodiments, the bracket assembly may include a mounting bracket that couples to the vehicle frame. In some embodiments, the mounting bracket may be modular and retro-fittable. The mounting bracket may include quick-release connectors. In other embodiments, the mounting bracket may include a series of bolts.

In some embodiments, the bracket assembly may further include at least one mudflap attachment. The mudflap attachment may include a series of bolts that couple the mudflap to the bracket assembly. In some embodiments, the panel may include a rigid plate. In some embodiments, the rigid plate may be an acrylic. An illustration may be etched into the panel such that the illustration is illuminated by the lighting element.

In some embodiments, the rigid mudflap may further include a protective coating on at least one surface of the mudflap. The protective coating may be a rubber, a vinyl, or a clear plastic.

In some embodiments, an illustration or a logo may be located between the protective coating and the panel.

It is to be understood that both the foregoing general description and the following detailed description are examples and explanatory and are not restrictive of the invention, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present invention. The following detailed description is, therefore, not to be taken in a limiting sense.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. These drawings depict only typical embodiments of the invention and are not therefore to be considered to limit the scope of the invention.

Example embodiments will be described and explained with additional specificity and detail through the use of the accompanying figures in which.

DESCRIPTION OF EMBODIMENTS

For the purpose of promoting an understanding of the principles of the invention, reference will now be made to the embodiments illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

The term "embodiment", "example", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Figure 1A:
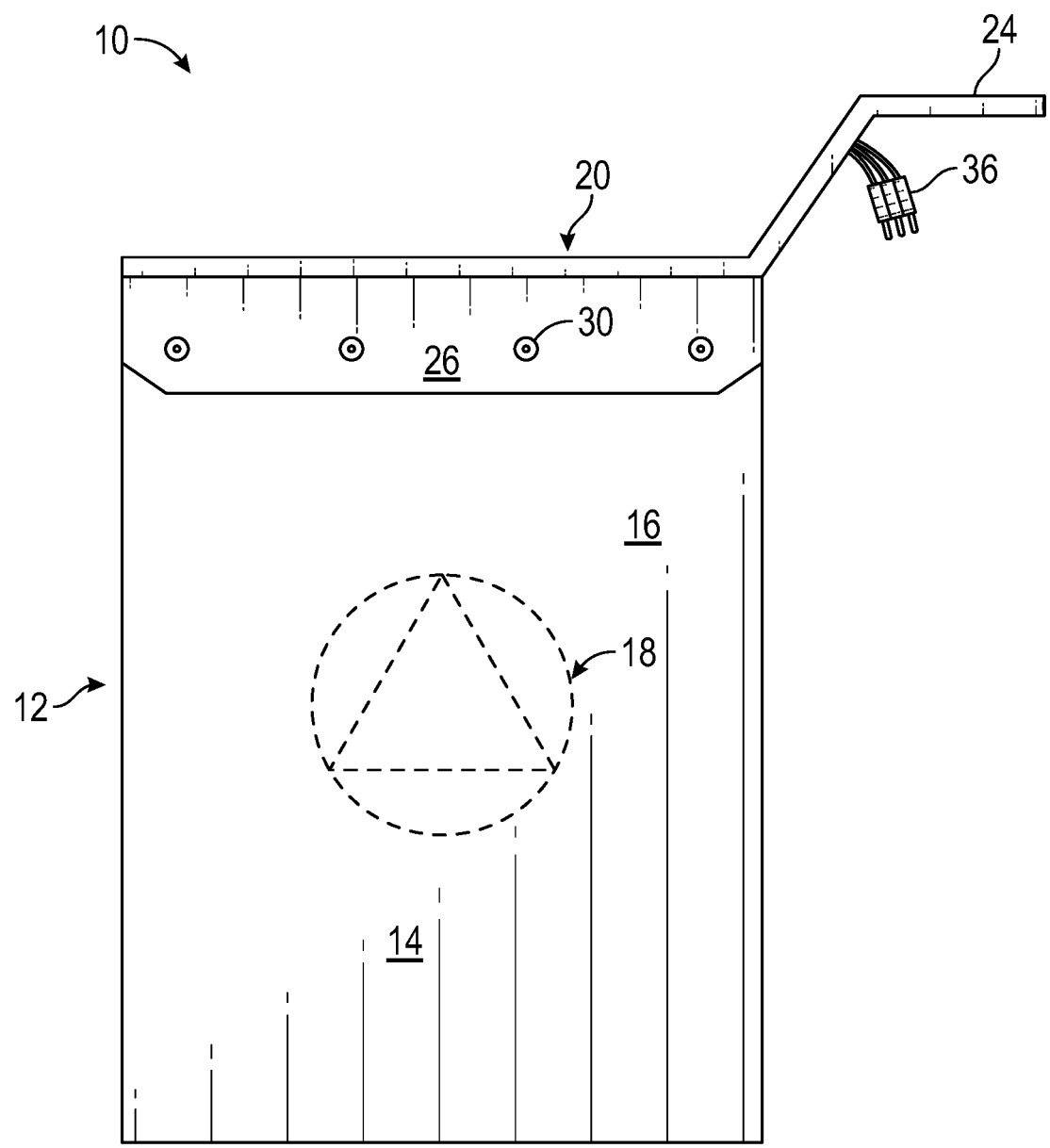
FIG. 1A is a perspective view of a mudflap assembly, according to some embodiments.
Figure 1B:
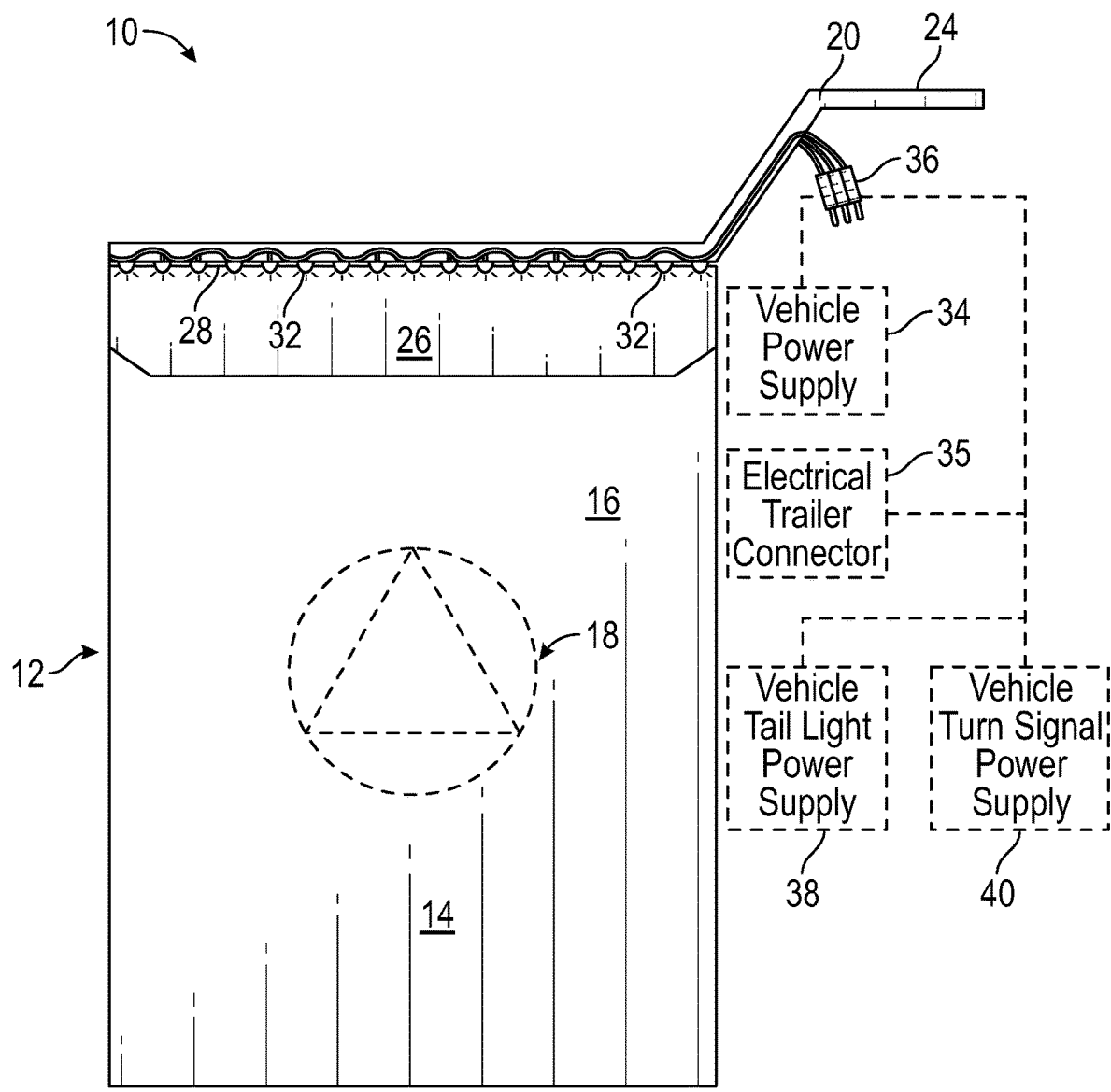
FIG. 1B illustrates a cross-sectional view of the mudflap of FIG. 1A, showing a lighting element, according to some embodiments.

Referring now to FIGS. 1A-1B, in some embodiments a mudflap assembly 10 may include a mudflap 12. The mudflap 12 provides several benefits to a vehicle because they deflect road debris and make the vehicle more durable, able to better withstand harsh weather conditions, and may prevent damage and dents to the vehicle. In some embodiments, the mudflap 12 may include a panel 14. In some embodiments, the panel may include a rigid plate 16. The rigid plate 16 may be an acrylic. In some embodiments, panel 14 may be formed from a plastic material such as polyethylene or any suitable composition. In some embodiments, the panel 14 may be transparent or translucent. In some embodiments, the panel 14 may include materials that easily reflect light such as metal, metallic alloys, biaxially-oriented polyethylene terephthalate, and/or fiberglass and also resists wear from the impact of road debris. The panel 14 may be rigid or flexible.

In some embodiments, the mudflap assembly 10 may further include a bracket assembly 20. Generally, the bracket assembly 20 couples the mudflap 12 to a vehicle frame 22. The vehicle frame 22 may be part of any suitable vehicle, for example, trucks, trailers, cars, buses, semi-trailer truck, and the like. The mudflap assembly 10 may be utilized at every tire location of the vehicle or at only some of the tire locations. These and other variations of the use of the disclosed mud flap assemblies 10 on different vehicles and in different configurations are contemplated and should be considered within the scope of the present disclosure.

In some embodiments, the bracket assembly 20 may include a rigid frame 24 that couples to the vehicle. The bracket assembly 20 may be metal such as a stainless steel or aluminum. The bracket assembly 20 may be coupled to the mudflap 12 with a mudflap attachment 26. In some embodiments, the mudflap attachment 26 may couple the bracket assembly 20 to the mudflap 12 along a first edge 28 of the panel 14. The mudflap attachment 24 may include a series of bolts 30 that couple the mudflap 12 to the bracket assembly 20. The series of bolts 30 may be aligned across the first edge 28 of the mudflap 12 in a horizontal direction. The mudflap 12 may be coupled to the bracket assembly 20 by a weld, adhesive, or other suitable method. The series of bolts 30 allow the mudflap 12 to be interchangeable. Other suitable interchangeable methods may also be utilized, for example, clamping devices or hooks.

In some embodiments, the mudflap assembly 10 may include a lighting element 32 encased in the bracket assembly 20. While the lighting element 32 is preferably arranged within or on the bracket assembly 20 to provide a degree of protection for the lighting element 32 from damage, the lighting element 32 may be located elsewhere on the mudflap 10, such as in the panel 14 of the mudflap 12. The lighting element 32 may be proximate to the first edge 28 of the panel 14. The lighting element 32 may be configured to illuminate the panel 14.

The lighting element 32 may be a series of light emitting diodes (LEDs), but other forms of light (e.g. incandescent, fluorescent) are contemplated. The lighting element may be powered by a vehicle power supply 34. In some embodiments, the lighting element may be connected to the corresponding vehicle power circuit in the vehicle's wiring system by quick disconnect plug 36 such as an electrical trailer connector 35. In some embodiments, the lighting element may be powered via wiring that is electrically coupled to the vehicle power supply 34. In some embodiments, the lighting element 32 may be coupled to the vehicle tail light power supply 38 and/or a vehicle turn signal power supply 40.

With these elements connected, the lighting element 32 may be used as a marker that is continuously on while the vehicle is powered on; as a stop light or tail light that, when powered by the vehicle tail light power supply 38, is illuminated, changes color or pattern, and/or changes light intensity when brakes of the vehicle are applied; and/or as a turn light that, when powered by the vehicle turn signal power supply 40, is illuminated, changes color or pattern, and/or changes light intensity when a turn signal of the vehicle is applied.

The lighting element 32 may be any color and offers cosmetic aesthetics and increases vehicle visibility in bad weather and during low-light conditions. In some embodiments, lighting element 32 may include a series of different colored lights that may indicate different signals. Lighting patterns may include the lighting element 32 being illuminated in a series of lights, for example, a first light being illuminated and then a second in series and so forth to indicate a turn signal or stopping. Other examples may include the lighting element 32 changing colors, flashing, pulsing, or any other suitable pattern known to signal safety precaution, turning, or dangerous conditions.

In an embodiment where the illustration 18 may be etched into acrylic or otherwise embedded in the panel 14, the illustration 18 may be particularly illuminated with respect to the rest of the panel. Other methods of highlighting the illustration 18 with the lighting element 32 are also contemplated, such as by paints having glow or reflective properties, light sensitive paints or embedded circuits, reflective material, placing the illustration 18 behind or in front of the panel 14, and/or utilizing fiber optics to form the illustration 18 or embed in the panel 14.

In some embodiments, the mudflap 12 may include an illustration 18 or logo on the panel 14. In at least one embodiment, the illustration 18 may be etched into acrylic. In other embodiments, the illustration 18 may be painted on the panel 14 or may be a sticker. Generally, the illustration 18 may be placed and sized for optimal visibility. In some embodiments, one or more of the various illustrations 18 be optionally configured as a word, symbol, logo, or other indicia. In some embodiments, the illustration 18 may be safety symbols or messages such as the word "STOP," "DANGER," "KEEP BACK," or other word, or be configured as a red hand in a "stop" gesture, a conventional stop sign, or other shape, or any other suitable illustration 18 contemplated by one skilled in the art. Alternatively, one or more of the illustrations 18 may be in the form of a company name or logo (e.g., the Amazon "smile" logo, etc.). Optionally, the letters, words, or other images could be displayed on imaging screens or monitors, instead of LEDs, and safely encased within the rigid plate 16 described above.

Figure 2A:
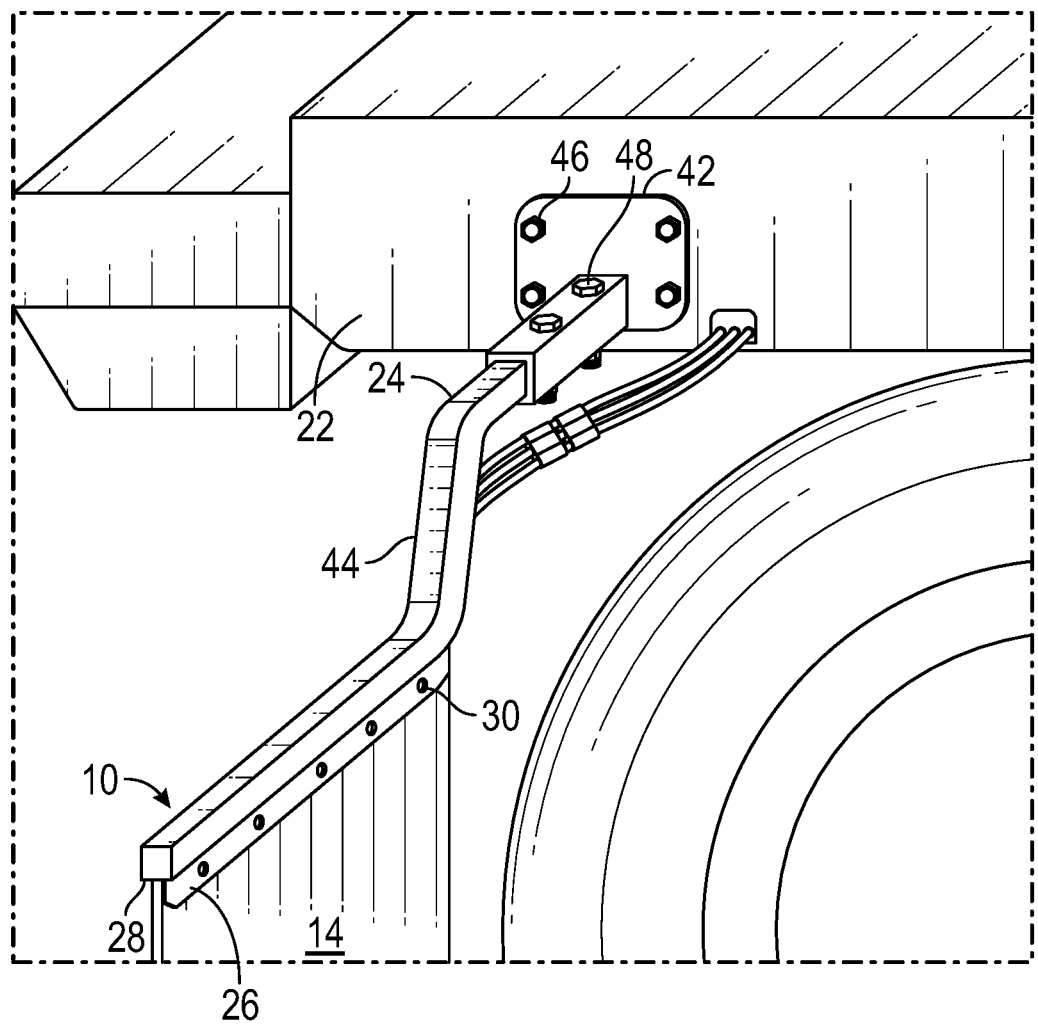
FIG. 2A is a perspective view of a bracket assembly, according to some embodiments.
Figure 2B:
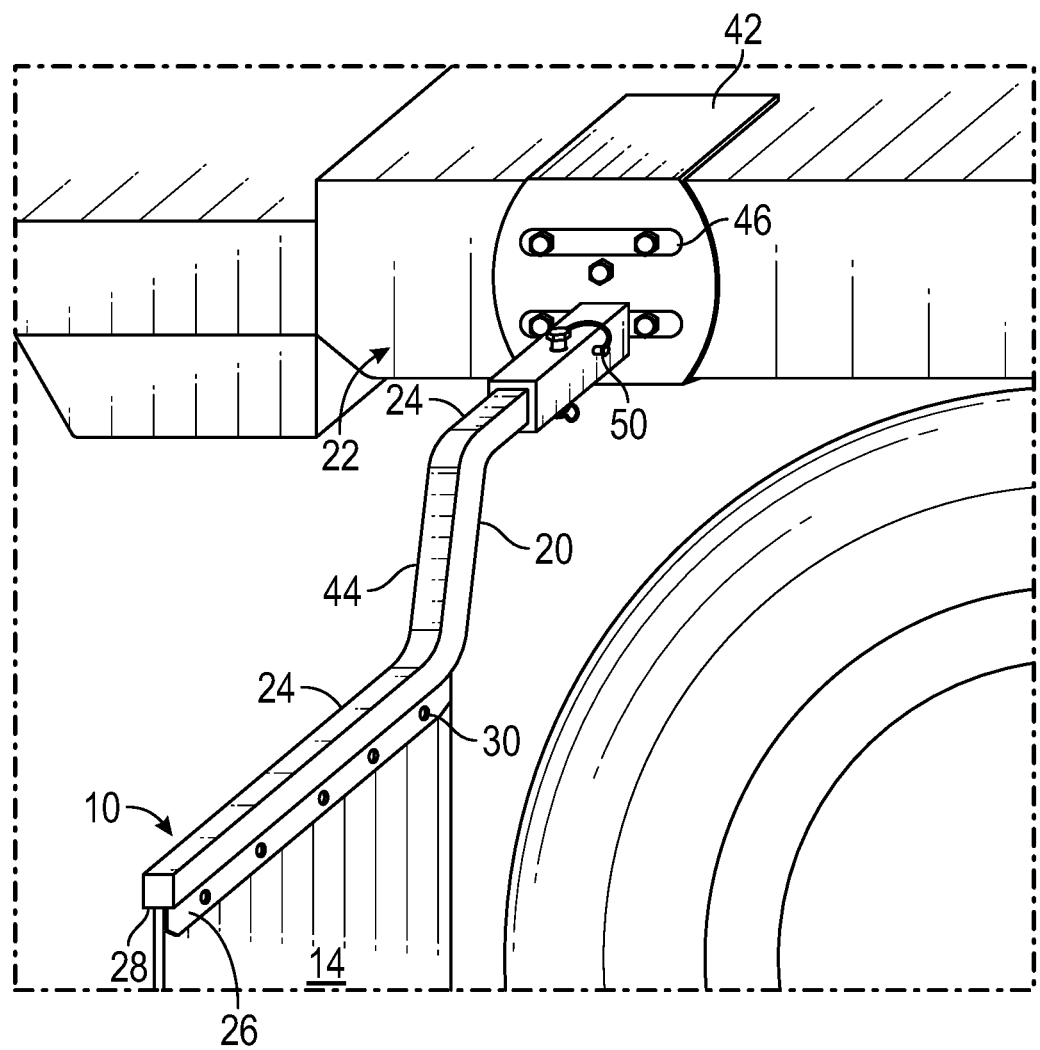
FIG. 2B is a perspective view of another bracket assembly, according to some embodiments.

Referring now to FIGS. 2A-2B, in some embodiments, the rigid frame 24 of the bracket assembly 20 may be held into place against the vehicle frame 22 by way of a mounting bracket 42 and fastened securely to the frame rail. In some embodiments, the rigid frame 24 may include an extension 44 that ensures the mudflap 12 is placed directly behind the tire of the vehicle, extending down from the vehicle frame 22. In some embodiments, the mounting bracket 42 is modular and retro-fittable such that the mudflap assembly may be coupled to a variety of vehicle frames. In some embodiments, the mounting bracket 42 is coupled to the vehicle frame 22 via frame bolts 46. The frame bolts 46 may hold the mounting bracket 42 against the frame rail in a secure position so that the mounting bracket 42 is unable to move from that position. In some embodiments, the mounting bracket 42 may be a flat bracket formed from a material having suitable strength and durability. In other embodiments, a pair of horizontal slots may be formed in the mounting bracket 42, and a fastener or bolts may extend horizontally through the slots to secure the bracket to the vehicle frame 22. Slots may allow for the adjustment of the position of mounting bracket 42 in the forward/aft direction. That is, the bolts may be loosened to allow the mounting bracket 42 to be moved forward or aft, as necessary, and then tightened to secure the position of the bracket relative to the vehicle frame 22. In some embodiments, the mounting bracket 42 may be coupled to the vehicle frame 22 by other suitable means such as welds or clamps.

In some embodiments, the bracket assembly 20 of the mudflap assembly 10 may couple to the mounting bracket 42 with a mounting bolt 48. The mounting bolt 48 may include a series of mounting bolts 48. In some embodiments, the bracket assembly 20 may couple to the mounting bracket 42 with a quick-release connector 50. The de-coupling of the bracket assembly 20 from the mounting bracket allow the mudflap 12 to be interchangeable. Other suitable interchangeable methods may also be utilized. It will be appreciated that the disclosed mounting bracket 42 and bracket assembly 20 are exemplary only and should not be considered limiting. In this regard, any suitable configuration for mounting bracket assembly 20 to the vehicle frame 22 may be utilized and such configurations should be considered within the scope of the present disclosure.

Figure 3:
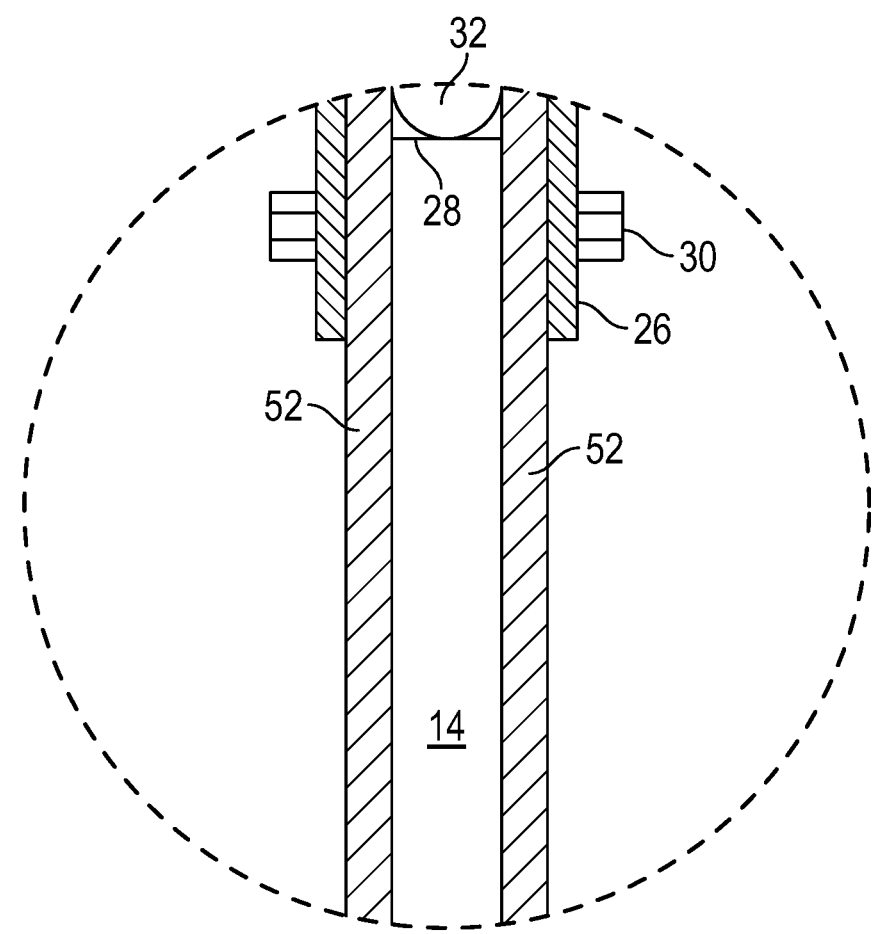
FIG. 3 is an enlarged side cross-sectional view of a mudflap, according to at least one embodiment.

Referring now to FIG. 3, in some embodiments, the mudflap 12 may further include a protective coating 52 on at least one surface of the mudflap 12. In some embodiments, the protective coating may be a rubber, a vinyl, or a clear plastic. The protective coating may vary in thickness to provide protection for the panel 14 and/or enhance the illumination effects of the lighting element 32. The protective coating 52 may include polymers, epoxies, and polyurethanes. The protective coating 52 may be painted on, sprayed on, plated on, or coupled to the panel 14 with an adhesive. The protective coating 52 may increase the wear resistance and aesthetic appeal of the mudflap 12. In some embodiments, the protective coating 52 may provide water resistance or electrical properties that enhance the illumination of the panel 14 or prevent cracking and/or shattering.

In some embodiments, the protective coating 52 may be transparent and/or translucent. In other embodiments, the protective coating 52 may include reflective layers or material to enhance illumination. In yet other embodiments, the protective coating may be a dark color such as a black rubber to protect the panel 14.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A mudflap assembly, comprising:
    a bracket assembly that couples to a vehicle frame, said bracket assembly comprising a channel;
    a mudflap comprising a panel having a first edge disposed within the channel and coupled to the bracket assembly; and
    a lighting element disposed within the channel and interposed between the channel and the first edge of the panel, wherein the lighting element is configured to illuminate the panel.

2. The mudflap assembly of claim 1, wherein the lighting element comprises a series of light emitting diodes (LEDs).

3. The mudflap assembly of claim 1, wherein the lighting element is powered by a vehicle power supply.

4. The mudflap assembly of claim 3, wherein the lighting element is connected to an electrical trailer connector.

5. The mudflap assembly of claim 3, wherein the lighting element is connected to a vehicle tail light power supply, wherein the lighting element changes light color, pattern, or intensity when the brakes of the vehicle are applied or the vehicle is in a reverse gear.

6. The mudflap assembly of claim 3, wherein the lighting element is connected to a vehicle turn signal, wherein the lighting element changes light color, pattern, or intensity when the turn signal of the vehicle is activated.

7. The mudflap assembly of claim 3, wherein the lighting element is constantly illuminated while the vehicle is powered on.

8. The mudflap assembly of claim 1, wherein the bracket assembly comprises a mounting bracket that couples to the vehicle frame.

9. The mudflap assembly of claim 8, wherein the mounting bracket is modular and retro-fittable.

10. The mudflap assembly of claim 8, wherein the mounting bracket comprises quick-release connectors.

11. The mudflap assembly of claim 8, wherein the mounting bracket comprises a series of bolts.

12. The mudflap assembly of claim 1, wherein the bracket assembly further comprises at least one mudflap attachment.

13. The mudflap assembly of claim 12, wherein the mudflap attachment comprises a series of bolts that couple the mudflap to the bracket assembly.

14. The mudflap assembly of claim 1, wherein the panel comprises a rigid plate.

15. The mudflap assembly of claim 14, wherein the rigid plate comprises an acrylic.

16. The mudflap assembly of claim 1, further comprising an illustration, wherein the illustration is etched into the panel such that the illustration is illuminated by the lighting element.

17. The mudflap assembly of claim 1, wherein the mudflap further comprises a protective coating on at least one surface of the mudflap.

18. The mudflap assembly of claim 17, wherein the protective coating is a rubber, a vinyl, or a clear plastic.

19. The mudflap assembly of claim 17, wherein an illustration is located between the protective coating and the panel.

\* \* \* \* \*